(12) United States Patent
Bookshar et al.

(10) Patent No.: US 6,516,896 B1
(45) Date of Patent: Feb. 11, 2003

(54) TORQUE-APPLYING TOOL AND CONTROL THEREFOR

(75) Inventors: Duane R. Bookshar, Highland Heights, OH (US); John A. Borries, Chardon, OH (US); Daniel Bogert, Wickliffe, OH (US)

(73) Assignee: The Stanley Works, New Britain, CT (US)

(*) Notice: Subject to any disclaimer, the term of this patent is extended or adjusted under 35 U.S.C. 154(b) by 0 days.

(21) Appl. No.: 09/917,151

(22) Filed: Jul. 30, 2001

(51) Int. Cl.[7] ............................................. E21B 7/00
(52) U.S. Cl. .................... 173/1; 173/93.5; 173/217; 173/2; 173/176
(58) Field of Search ............................. 173/1, 2, 4, 5, 173/6, 7, 93.5, 176, 177, 178, 181, 182, 183, 217; 81/479

(56) References Cited

U.S. PATENT DOCUMENTS

| | | | |
|---|---|---|---|
| 4,142,591 A | 3/1979 | Himmelstein | 173/12 |
| 4,294,110 A * | 10/1981 | Whitehouse | 73/862.23 |
| 4,375,121 A | 3/1983 | Sigmund | 29/407 |
| 4,562,389 A | 12/1985 | Jundt et al. | 318/432 |
| 4,908,928 A | 3/1990 | Mazurik et al. | 29/525.1 |
| 4,959,797 A | 9/1990 | McIntosh | 364/508 |
| 5,062,491 A | 11/1991 | Takeshima et al. | 173/12 |
| 5,113,949 A * | 5/1992 | Ohkubo et al. | 173/177 |
| 5,154,242 A | 10/1992 | Soshin et al. | 173/178 |
| 5,203,242 A | 4/1993 | Hansson | 81/469 |
| 5,205,031 A | 4/1993 | Hansson | 29/707 |
| 5,215,270 A | 6/1993 | Udocon et al. | 29/407 |
| 5,229,931 A | 7/1993 | Takeshima et al. | 364/133 |
| 5,245,747 A | 9/1993 | Hansson | 29/703 |
| 5,284,217 A * | 2/1994 | Eshghy | 173/176 |
| 5,315,501 A | 5/1994 | Whitehouse | 364/152 |
| 5,366,026 A * | 11/1994 | Maruyama et al. | 173/180 |
| 5,439,063 A * | 8/1995 | Anders et al. | 173/177 |
| 5,519,604 A | 5/1996 | Hansson | 364/148 |
| 5,631,823 A | 5/1997 | Layer et al. | 364/148 |
| 5,637,968 A | 6/1997 | Kainee et al. | 318/432 |
| 5,650,574 A | 7/1997 | Sato et al. | 73/862.23 |
| 5,689,434 A | 11/1997 | Tambini et al. | 364/510 |
| 5,715,894 A * | 2/1998 | Maruyama et al. | 173/180 |
| 5,837,907 A | 11/1998 | Ohmi et al. | 73/862.23 |
| H1821 H | 12/1999 | Kosinski | 173/180 |
| 6,161,629 A | 12/2000 | Hohmann et al. | 173/181 |
| 6,234,051 B1 | 5/2001 | Bareggi | 81/479 |

OTHER PUBLICATIONS

Atlas Copco, "One stage", 1996, p. 91.
Atlas Copco, "Quickstep", 1996, p. 93.
Atlas Copco, "The Complete System", 1996.

* cited by examiner

*Primary Examiner*—Scott A. Smith
*Assistant Examiner*—Nathaniel Chukwurah
(74) *Attorney, Agent, or Firm*—Pillsbury Winthrop LLP

(57) ABSTRACT

A method of controlling electric- and fluid-powered torque-applying tools to avoid torque overshoot and unwanted joint stresses. During a fastening operation, a controller monitors the peak torque applied to a joint at specified intervals in time and adjusts the speed of the tool appropriately to reach a programmed torque value without overshooting. The method may be applied to arbitrary types of joints and allows the tool to adapt to the characteristics of a joint while a fastening operation is underway, without a separate "learning" or "adaptation" phase.

31 Claims, 13 Drawing Sheets

TORQUE-APPLYING TOOL AND CONTROL THEREFOR

BACKGROUND OF THE INVENTION

1. Field of the Invention

This invention relates to electric- or fluid-powered torque-applying tools, and more specifically, to control methods for such power tools.

2. Description of Related Art

Computer-controlled fluid- or electric-power tools are typically used in production environments to secure threaded fasteners (e.g., nuts and bolts) into joints. Such power tools typically include a handheld unit coupled to a controller. The handheld unit, or tool, usually has a high-speed, high-torque motor coupled to a universal adapter head. Various interchangeable bits are connected to the head in order to drive threaded fasteners, e.g., bits appropriate for hex-head bolts and hexagonal nuts. The motor of each handheld unit is usually rated to apply no more than a maximum amount of torque, and is also usually rated to run at no more than a maximum speed.

The controller for each handheld unit controls the power supply for each handheld unit, and also monitors such parameters as the current tool speed and current applied torque. In a typical fastening job, fasteners are tightened to a predetermined, specified torque. As the handheld units operate at high speed, on the order of several hundred RPM, the controller is typically used to start and stop the motor of the handheld unit automatically so that the torque applied to the fastener and joint does not exceed the specified torque or the torque rating of the tool's motor.

The high speed at which the tool's motor operates means that a single fastening job, for example tightening a single bolt, may only require a few milliseconds. Therefore, even though the tools are computer-controlled, there is a substantial likelihood that the tool will "overshoot" the desired torque, thus increasing the stress on the joint and potentially damaging the tool.

Joints are usually classified by their torque/turn rates. The torque/turn rate is defined as the ratio of change in torque per unit of rotation of the fastener. A fastening application is considered "soft" when the torque/turn rate is low, and is considered "hard" when the torque/turn rate is high. Joints may also be classified as "medium" or may be completely irregular in their properties.

In evaluating the characteristics of a fastening job, the tool's torque/time rate is also important. The torque/time rate is dependent upon the rotational speed of the tool and the torque/turn rate of the fastener itself, therefore, the torque/time rate is strongly influenced by the torque/turn rate. In general, a high torque/time rate is indicative of a "hard" joint, while a relatively low torque/time rate is indicative of a "soft" joint. A high torque/time rate is one of the factors which contributes to the problem of torque "overshoot."

To remedy the problem of torque overshoot, the user may simply choose to run the tool at a lower rotational speed. Unfortunately, that simple solution is not practical in production environments because a slower-running tool takes more time to finish a tightening process, thereby decreasing worker productivity and potentially causing the tool motor to overheat.

Because of the variability in joint properties, it becomes difficult to design a computer algorithm to properly control a torque-applying tool. Previous attempts have resulted in algorithms with somewhat limited utility.

Commonly-assigned U.S. Pat. No. 5,315,501 to Whitehouse discloses an algorithm for controlling power tools. The algorithm determines an internal torque target based upon the torque/turn or torque/time rate of the joint and dynamic characteristics of the tool, where the rate is calculated based on the controller-observed properties of several different joints. For optimum results, this algorithm must be used on a joint in which the amount of torque monotonically increases. This type of joint is not often encountered in practice, thus limiting the applicability of the algorithm. In cases where the algorithm can be applied, the controller is required to analyze up to 75% of the torque/turn characteristic of the joint before enabling the control algorithm. Given that "hard" joints can be tightened in less than 10 ms, the controller usually does not have sufficient time to shut the tool down when the internal torque target is reached, resulting in torque overshoot. The method also preferably requires the use of an angular measuring device, which increases the cost of the system. Moreover, the angular measurements required for the method may not be accurate, because in a typical tool, the angular measurement changes if the user changes the position of the tool while tightening a joint.

Commonly-assigned U.S. Pat. No. 5,637,968 to Kainec et al. discloses an alternate method of power tool control in which the controller measures the torque/turn rate of the joint between 25% and 50% of the programmed target torque to classify the joint as either "soft," "medium," or "hard." The controller then issues a command to execute an immediate downshift in speed based on the joint classification. The controller continues the tightening process at the reduced speed until the programmed target torque is reached.

The design disclosed in the Kainec patent can be improved in several ways. First, on a "hard" joint, if the motor speed is reduced at 50% of the target torque and the tool is running at, for example, 1500 RPM, the tool has only about 1.5 ms to slow down before the target torque is reached, whereas the typical response time for a control system can be much greater than that. The immediate downshift imposed by the Kainec method is undesirable because the immediate change in speed can induce damaging dynamic loads on the motor and gearing. Immediate downshifts also consume more power, because the controller attempts to dynamically brake the tool's motor. Moreover, the dynamic braking process itself causes the tool and controller to heat up unnecessarily.

The classification system imposed by the Kainec method also imposes some limitations. By categorizing all joints into one of only three categories and requiring a specific, fixed downshift in tool speed for each category, the method may prevent the controller from tightening each joint optimally. For example, a joint with a characteristic between "hard" and "soft" would be classified as a "medium" joint, and the controller would reduce speed at 50% of the target torque, which would actually increase the amount of time it takes to fasten the joint. For most joints, the Kainec method actually increases the amount of time it takes to fasten the joint. Additionally, the method does not account for the tool's speed, so even when a joint is correctly classified, torque overshoot may still be a problem because a faster tool on a particular joint may require a greater reduction in tool speed in order to avoid overshoot.

Immediate downshifts in tool speed are also generally undesirable because of the manner in which torque-applying tools are tested. Typically, torque-applying tools are tested by using brakes to simulate the effects of tightening a threaded fastener. However, brakes have very high polar moments of inertia when compared to typical joint assemblies, which can affect the dynamic response time of the control system and an immediate downshift may cause instability, erratic torque readings, and thus, inaccurate test results.

Other power tool control algorithms that are commonly used include learning-based algorithms. A learning-based algorithm requires that the tool and controller be used on several "test" joints of a particular type so that the controller can adapt the tool's speed and performance to the characteristics of that particular joint. The controller runs the tool at various speeds until an optimum speed profile is determined for the particular type of joint. Unfortunately, once the learning algorithm is employed, the tool and controller may only be used optimally on the particular type of joint for which the controller has "trained."

One example of this type of learning-based algorithm is disclosed U.S. Pat. No. 5,215,270 to Udocon et al. The disclosed method applies continuous feedback control over the tool's speed to maintain an "optimum" speed. The optimum speed is calculated by using an equation which includes empirical constants that must be determined for each joint. The method may either increase or decrease the tool's speed to meet the calculated optimum speed.

Another example of a learning-based algorithm is disclosed in U.S. Pat. No. 5,650,574 to Sato et al. In this method, a family of tool speed profiles are precalculated and are stored in the tool controller. Over the course of several learning cycles, the controller implements each one of the family of tool speed profiles in succession, changing speed profile until the chosen tool speed profile causes no torque overshoot.

Aside from learning-based methods, some power tool control methods have employed continuous feedback control of tool speed based on the tool's measured, applied torque, but these methods generally do not prevent torque overshoot. For example, U.S. Pat. No. 5,519,614 to Hansson discloses a similar continuous feedback control method in which the tool is held to a calculated, optimum rate of torque application, but the control method is used only to control the reaction forces experienced by the user.

SUMMARY OF THE INVENTION

There exists a need for an adaptive control method for a torque-applying tool that correctly fastens a joint to a specified torque without overshoot, regardless of the torque rate or class of the joint, or that does not require the torque-applying tool to test or learn a particular type of joint.

An exemplary method of controlling a torque-applying tool to apply a selected torque by controlling a speed of the torque applying tool includes calculating a first torque at an end of a deceleration ramp that is a percentage of the selected torque, calculating a second torque at a start of the deceleration ramp that is a percentage of the selected torque, calculating a first speed at the end of the deceleration ramp that is a percentage of a selected speed, periodically determining a peak torque applied by the tool, determining if the peak torque is greater than the first torque, stopping the tool, if the peak torque is greater than or equal to the first torque and the selected torque, determining if the peak torque is greater than or equal to the second torque, if the peak torque is not greater than the first torque, and calculating parameters descriptive of the deceleration ramp and controlling the speed in accordance with the parameters, if the peak torque is greater than or equal to the second torque.

Another exemplary method of controlling a torque applying tool to apply a selected torque by controlling a speed of the torque applying tool includes determining a final torque value, determining a final speed value, decreasing speed levels until the torque applying tool reaches the final torque value, periodically measuring the torque level until the final torque value is measured, and stopping the torque applying tool when the selected torque value is reached.

An exemplary torque-applying tool according to the invention includes a motor, a drive head that is driven by the motor, a sensor package including a torque sensor and a speed sensor, and a controller that calculates a first torque at an end of a deceleration ramp that is a percentage of a selected torque, calculates a second torque at a start of the deceleration ramp that is a percentage of the selected torque, calculates a first speed at the end of the deceleration ramp that is a percentage of a selected speed, periodically determines a peak torque applied by the tool, determines if the peak torque is greater than the first torque, stops the tool, if the peak torque is greater than or equal to the first torque and the selected torque, determines if the peak torque is greater than or equal to the second torque, if the peak torque is not greater than the first torque, and calculates parameters descriptive of the deceleration ramp and controls the speed in accordance with the parameters, if the peak torque is greater than or equal to the second torque.

An exemplary controller for a torque-applying tool including a motor, a drive head that is driven by the motor, a sensor package including a torque sensor and a speed sensor, calculates a first torque at an end of a deceleration ramp that is a percentage of a selected torque, calculates a second torque at a start of the deceleration ramp that is a percentage of the selected torque, calculates a first speed at the end of the deceleration ramp that is a percentage of a selected speed, periodically determines a peak torque applied by the tool determines if the peak torque is greater than the first torque, stops the tool, if the peak torque is greater than or equal to the first torque and the selected torque, determines if the peak torque is greater than or equal to the second torque, if the peak torque is not greater than the first torque, and calculates parameters descriptive of the deceleration ramp and controls the speed in accordance with the parameters, if the peak torque is greater than or equal to the second torque.

BRIEF DESCRIPTION OF THE DRAWINGS

Various exemplary embodiments will be described with reference to the following drawings, in which like reference characters represent like features, wherein.

DETAILED DESCRIPTION OF EXEMPLARY EMBODIMENTS

Figure 1:
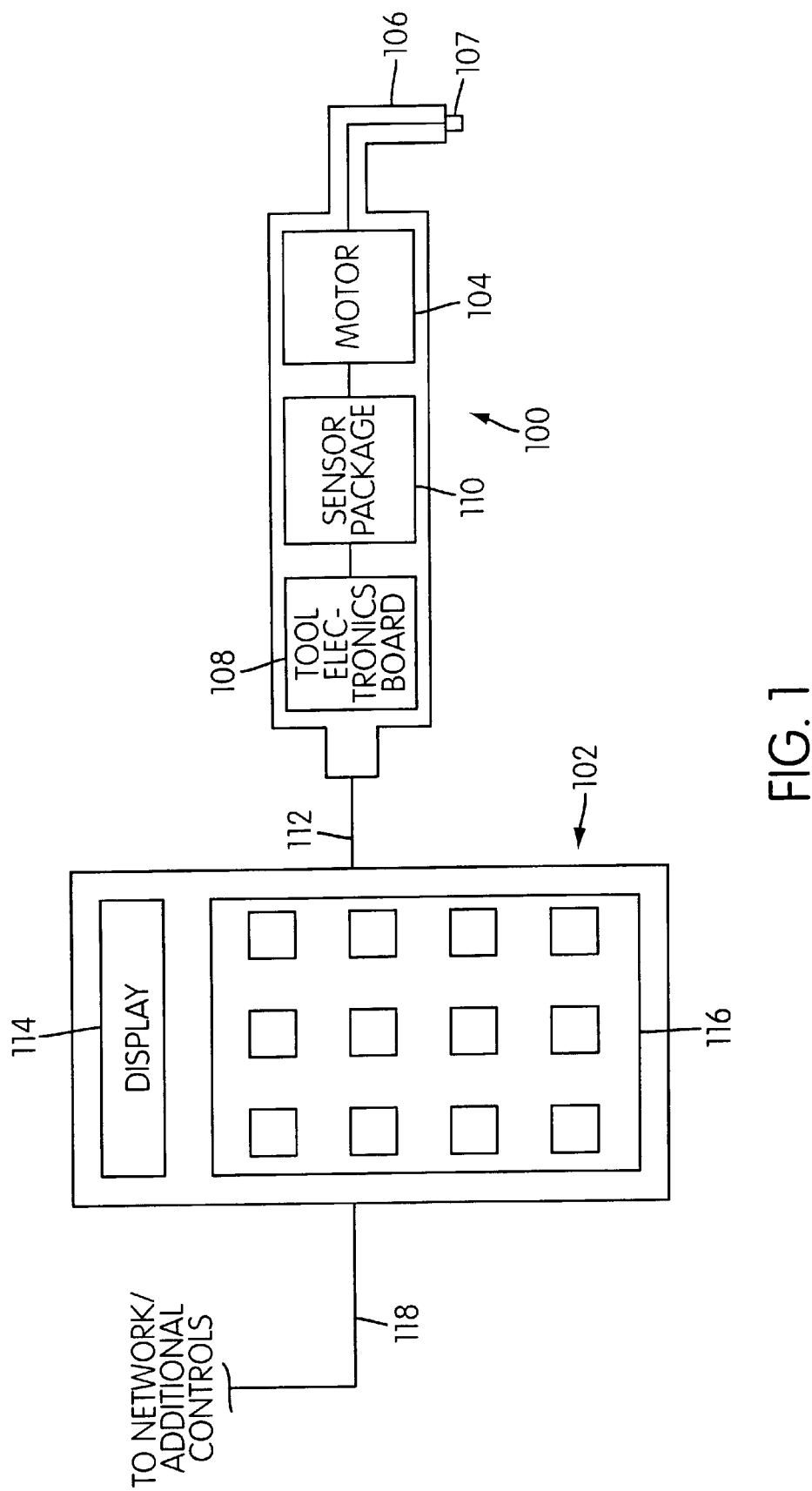
FIG. 1 illustrates a torque-applying tool and controller according to the present invention.

FIG. 1 illustrates an exemplary torque-applying tool 100 and controller 102 according to the present invention. The tool 100 includes a high speed electric motor 104 coupled to a drive head 106. The drive head 106 includes a rotatably driven spindle 107 that accepts interchangeable threaded fastener engaging members, such as sockets, allowing the tool 100 to drive a variety of threaded fasteners. The tool 100 also includes a tool electronics board (TEB) 108 that interfaces electronically with the controller 102, and a sensor package 110 that communicates with the controller 102. The torque and speed rating of the motor 104 of the torque-applying tool 100 are stored in the tool electronics board 108. The sensor package 110 includes a torque sensor and a speed sensor that measure the torque applied by the tool 100 and the speed at which the tool 100 is operating, respectively. A tool without a tool electronics board 108 may be used in the present invention if the tool parameters that are typically stored in the tool electronics board 108 are entered into the controller 102 by a user, or through other means.

The sensor package 110 may be integral to the motor 104. For example, the motor 104 may be a brushless servomotor with an internal angular encoder that determines the position of the armature relative to the stator windings. Such an angular encoder may also be used to determine if an error condition exists during tightening, as will be described below.

Although the torque-applying tool has thus far been described with respect to a tool including an electric motor, it should be understood that the present invention may be applied to a number of different types of computer-controlled torque-applying tools, of which tool 100 is only one example. In particular, the present invention may also be applied to computer-controlled fluid powered tools, such as pneumatic and hydraulic tools. It should also be understood that the tool 100 need not be a handheld tool. Rather, a tool 100 could be mounted in a permanent, articulating fixture and controlled remotely or robotically. Such a mounted tool would be especially applicable to an industrial assembly line environment, in which it might be programmed to activate when a part reaches a predetermined location in the assembly line.

The controller 102 provides a user-programmable interface for the tool 100, communicating with the tool electronics board 108 through connector 112. The controller 102 has a display 114, for example an LED display, and an input panel 116. The input panel 116 allows a user to input process parameters for a specific fastening job into the controller 102, such as a programmed target torque and a programmed free speed. The controller 102 may also be provided with a network interface 118. The network interface 118 connects the controller 102 to an external computer, such as a personal computer, so that the programmed target torque and the programmed free speed can be input remotely. The network interface 118 also allows a number of controllers 102 and tools 100 to be programmed and monitored remotely by a single user at a single computer. In the following discussion, it is understood that a user may program the controller 102 either from the input panel 116 or from an external computer connected to the network interface 118 with the same results.

It should also be understood that although the controller 102 in this exemplary embodiment is implemented as a specialized computer system with its own microprocessor, display 114, and input panel 116, the controller 102 may be a general purpose computer or any other computing system capable of implementing the controls 200, 300 that are discussed below. It should also be appreciated that the controller may be integrated into the tool 100, rather than provided separately.

The controller 102 monitors the torque and the speed of the tool 100 during fastening operations and adjusts the speed of the tool 100 appropriately to prevent torque overshoot. In a first exemplary embodiment of the present invention, the controller 102 determines the peak torque applied by the tool 100 at 1 ms intervals and commands changes in the speed of the tool 100 in accordance with the determined torque. The controller 102 actively adjusts the speed of the tool 100 while the tool is in operation and does so without the use of an angular encoder. This type of continuous, active control over the speed of the motor 100 minimizes torque overshoot while maintaining a fast time-to-torque.

Figure 2:
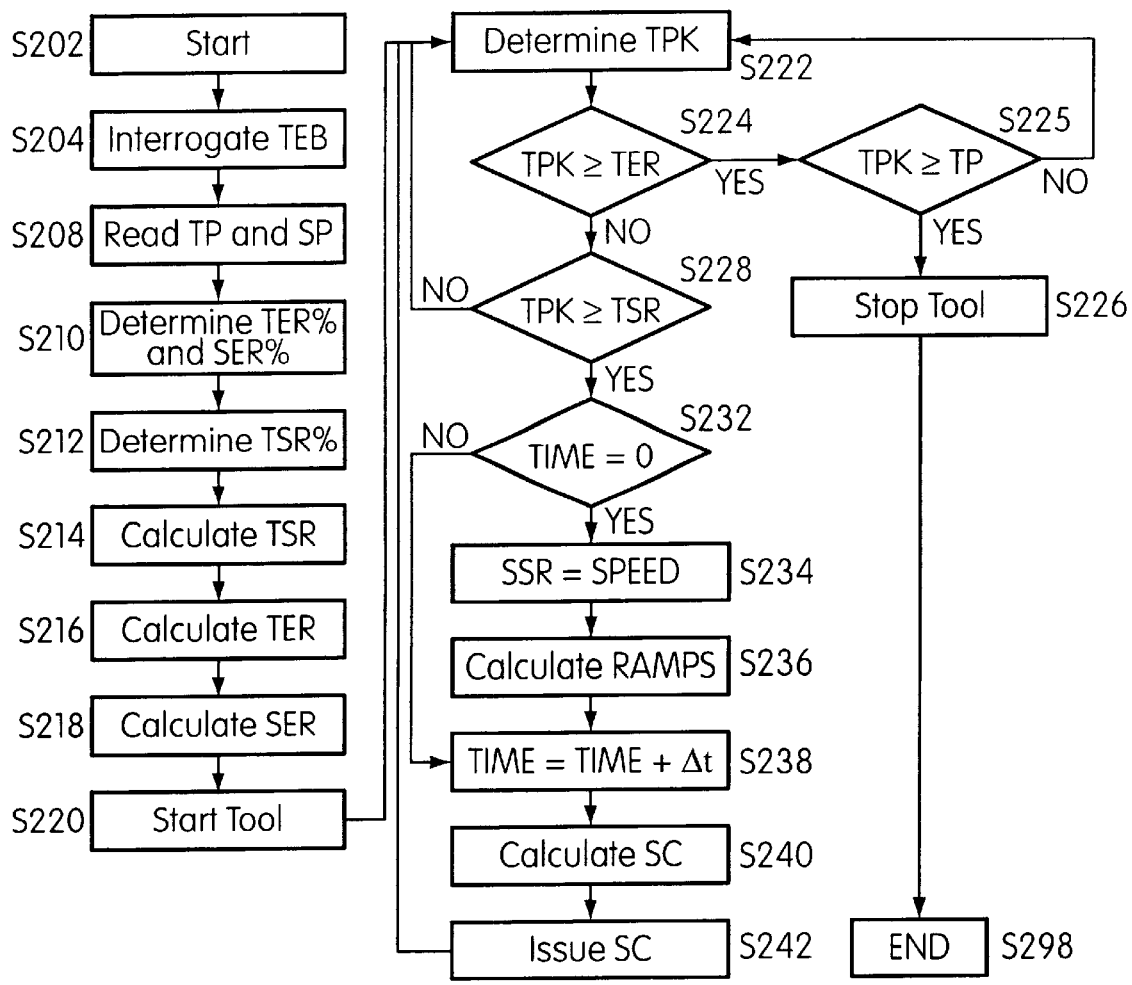
FIG. 2 is a flow diagram illustrating a method of controlling a tool according to one exemplary embodiment of the present invention.

FIG. 2 is a flow diagram illustrating a first exemplary embodiment of a control 200 implemented by the controller 102 to control the speed of the tool 100 during operation. The control 200 may be embodied in a computer program stored in tie controller 102, and uses certain fastening process parameters and values, the abbreviations and meanings of which are listed in Table 1.

TABLE 1

| Abbreviation | Explanation |
| --- | --- |
| SR | Speed Rating of Tool |
| TR | Torque Rating of Tool |
| TP | Programmed Target Torque |
| TP % | Target Torque Percent of Rated Torque |
| SP | Programmed Free Speed |
| TPK | Peak Measured Torque |
| TSR | Torque at Start of Ramping |
| TSR % | Percent of Programmed Torque at Start of Ramping |
| SSR | Speed at Start of Ramping |
| TER | Torque at End of Ramping |
| TER % | Percent of Programmed Torque at End of Ramping |
| SER | Speed at End of Ramping |
| SER % | Percent of Rated Speed at End of Ramping |
| SC | Speed Command |

Control 200 begins in S202 when the controller 102 and tool 100 are first turned on. Control then proceeds to S204 where the controller 102 interrogates the tool electronics board 108 to determine the torque rating and the speed rating of the tool 100. Control then proceeds to S208. In S208 a programmed free speed SP and programmed target torque TP (the target final torque on the joint) are input either at the controller input panel 116 or at a computer connected to the network interface 118.

The control 200 uses ramped speed profiles to control the speed of the motor 104. In other words, once the controller 102 determines that the speed of the tool 100 should be decreased, it decreases the speed command SC in proportion to the increase in torque. The controller 102 implementing control 200 starts the speed "ramp down" at the preprogrammed percent of programmed torque at start of ramping TSR %. Control 200 stops the speed "ramp down" of the motor 104 by determining the peak measured torque TPK and comparing the peak measured torque TPK to parameters that are stored in or determined by the controller 102. The parameters include the torque at the start of the ramping TSR and the torque at the end of ramping TER.

In general, the value chosen for the percent of programmed torque at the start of ramping TSR % should be chosen so as to be high enough to avoid premature enabling of control 200 before the joint is sufficiently snug, but should also be low enough to allow sufficient time to enable control 200 before the joint is completely tightened.

After input of the programmed target torque TP and the programmed free speed SP in S208, the control 200 proceeds to S210. In S210, the percent of programmed torque at the end of ramping TER % and the percent of rated speed at the end of ramping SER % are determined. In this embodiment, the percent of programmed torque at the end of ramping TER % and the percent of rated speed at the end of ramping SER % are fixed values that are stored in a memory of the controller 102 or a computer connected to the controller 102 by the network interface 118. In an exemplary embodiment of the invention, the percent of programmed torque at the start of ramping TSR % is 20%, the percent of programmed torque at the end of ramping TER % is 100% and the percent of rated speed at the end of ramping SER % is 20%.

After the percent of programmed torque at the end of ramping TER % and the percent of rated speed at the end of ramping SER % are determined in S210, the control 200 proceeds to S212. In S212, the percent of programmed torque at the start of ramping TSR % is determined. In this embodiment, the percent of programmed torque at the start of ramping TSR % is a fixed value that is stored in a memory of the controller 102 or a computer connected to the controller 102 by the network interface 118. In an exemplary embodiment of the invention, the percent of programmed torque at the start of ramping TSR % is 20%. The actual values for TER %, SER %, and TSR % may be preset in a variety of ways. Although the percentages TER %, SER % and TSR % have been described as fixed values stored in a memory of the controller 102 or a computer connected to the controller, it should be appreciated that a user may select from several discrete sets of fixed, preset values for TER %, SER %, and TSR %. The effect of these parameters on the performance of the tool 100 will also be discussed below with reference to the various examples.

After determining the percent of programmed torque at the start of ramping TSR % in S212, the control 200 proceeds to S214. In S214, the torque at the start of ramping TSR is calculated. The torque at the start of ramping TSR is calculated by multiplying the programmed target torque TP by the percent of programmed torque at the start of ramping TSR %, as in equation (1):

$$TSR = TP \times TSR\%  \quad (1)$$

The control 200 then proceeds to S216. In S216 the torque at the end of ramping TER is calculated by multiplying the programmed target torque TP by the percent of programmed torque at the end of ramping TER %, as in equation (2):

$$TER = TP \times TER\%  \quad (2)$$

The control then proceeds to S218. In S218, the speed at the end of ramping SER is calculated by multiplying the rated speed SR by the percent of rated speed at the end of ramping SER %, as in equation (3):

$$SER = SR \times SER\%  \quad (3)$$

The control 200 then proceeds to S220. In S220 the tool 100 is started. The tool 100 may either be started automatically by the controller 102 once S218 is complete, or the tool may be started manually.

Figure 7A:
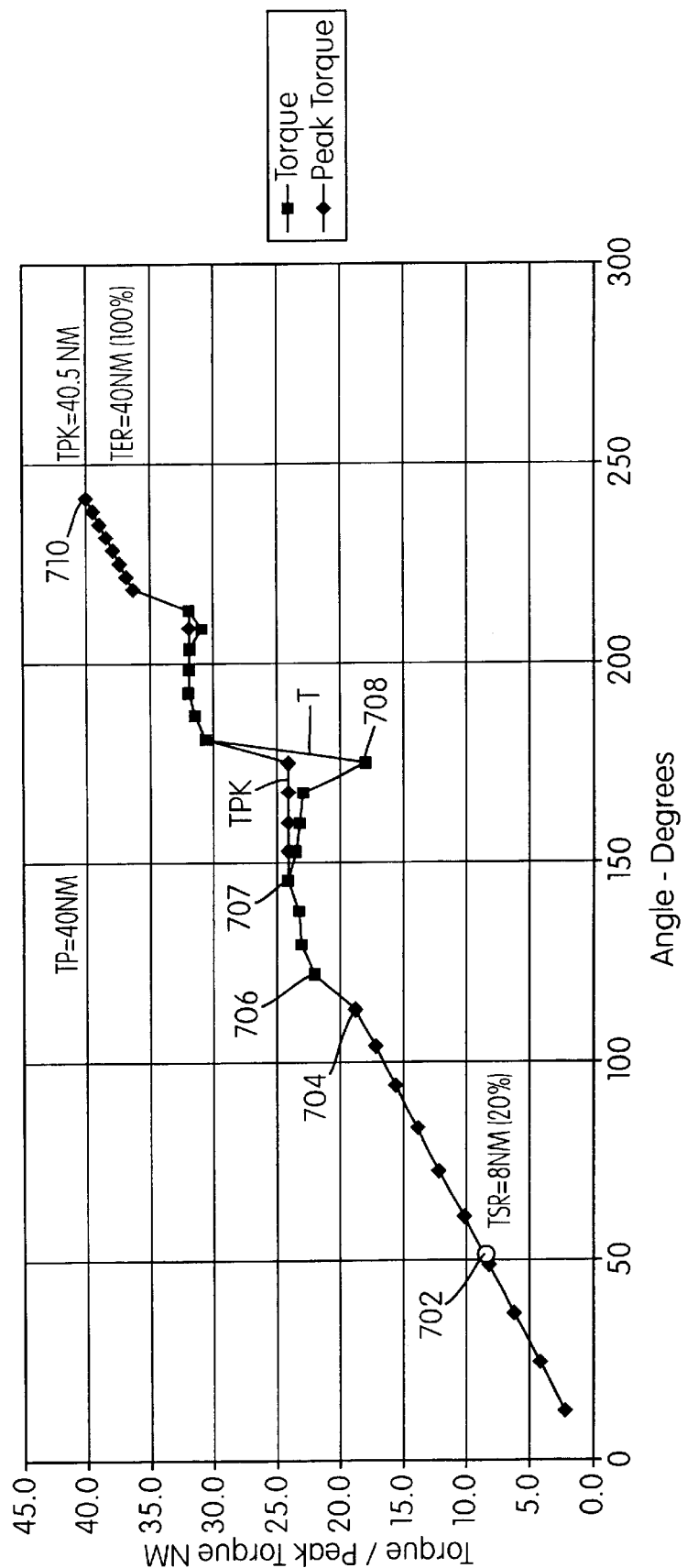
FIGS. 7A and 7B are plots illustrating a fourth example of a use of the present invention.
Figure 7B:
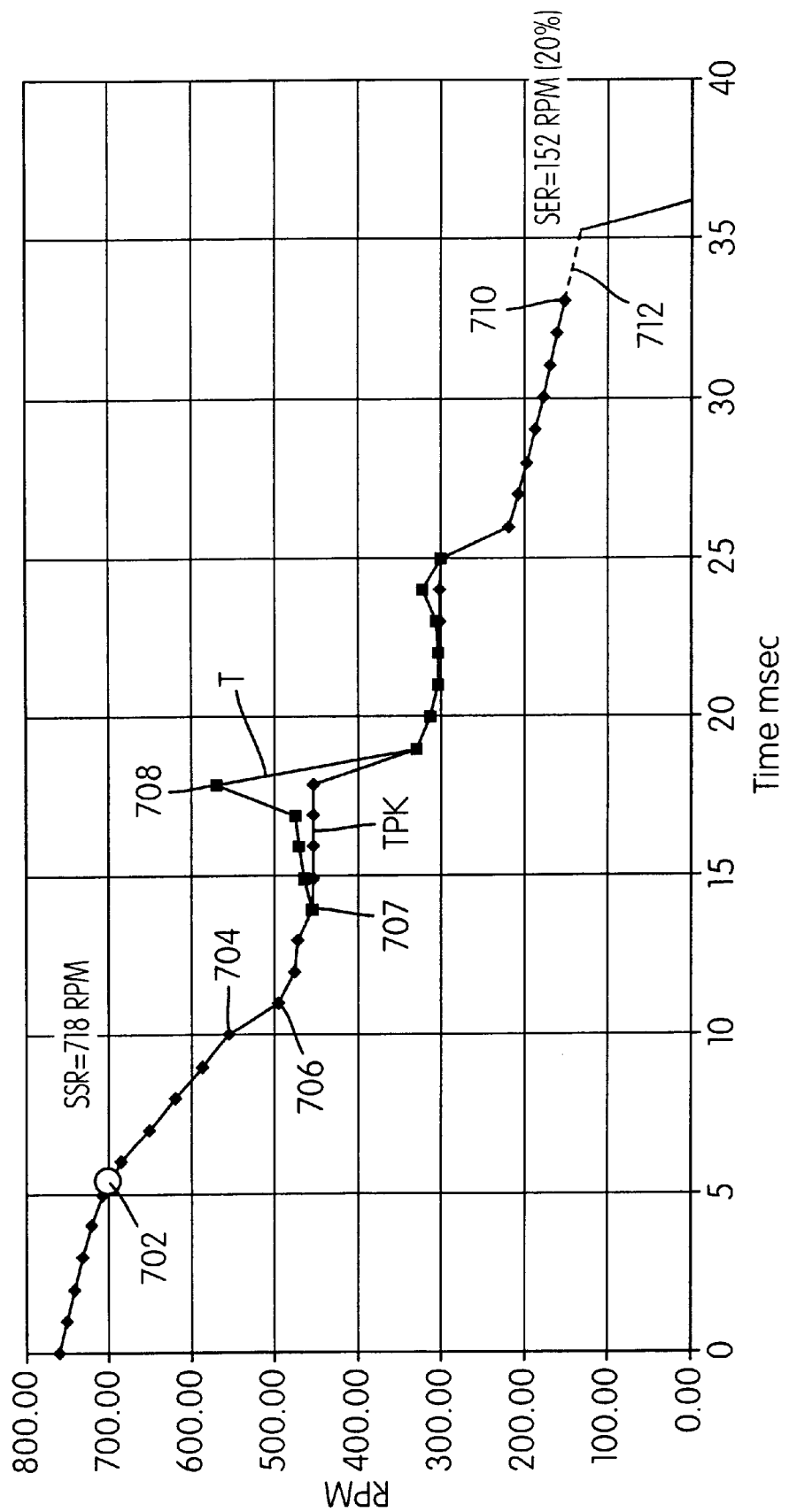

Once the tool 100 is started, the control proceeds to S222. In S222, the peak measured torque TPK of the tool 100 is determined. The controller 102 interrogates the sensor package 110 every millisecond, i.e., at a rate of 1 kHz, to read the current value of torque T applied by the tool 100 to the joint. As long as the torque T read by the sensor package 110 is increasing every millisecond, the peak measured torque TPK is equal to the torque T. However, as shown in FIGS. 7A and 7B, for example, between points 704 and 706 in FIGS. 7A and 7B the joint has a higher torque/turn rate and between points 706 and 707 the joint lower torque/turn rate than between points 704 and 706. After point 707, the torque/turn rate of the joint decreases and drops sharply at point 708. The peak measured torque TPK, however, remains constant between points 707 and 708. This allows the controller 102 to disregard small, momentary drops in the torque T. Further distinctions between the peak measured torque TPK and the torque T will be discussed below with reference to the various examples. It is understood that in order to determine the peak measured torque TPK, the controller 102 reads each incoming torque T from the sensor package 110 every millisecond to determine whether the torque T exceeds the value of the peak measured torque TPK that is stored in a memory of the controller 102 or a computer connected to the controller 102.

After determining the peak measured torque TPK in S222, the control 200 proceeds to S224. In S224, it is determined whether the peak measured torque TPK is greater than or equal to the torque at the end of ramping TER. If the peak measured torque TPK is greater than or equal to the torque at the end of ramping TER (S224: Yes), the control proceeds to S225 and it is determined if the peak measured torque TPK is greater than or equal to the programmed target torque TP. If the peak measured torque TPK is greater than or equal to the programmed target torque (S225: Yes), control 200 proceeds to S226 and the tool 100 is stopped. The control 200 than proceeds to S298 and ends. If the peak measured torque TPK is less than the programmed target torque TP (S225: No), control 200 returns to S222.

If the peak measured torque TPK is less than the torque at the end of ramping TER (S224: No), the control 200 proceeds to S228. In S228, it is determined whether the peak measured torque TPK is greater than or equal to the torque at the start of ramping TSR. If the peak measured torque TPK is not greater than or equal to the torque at the start of ramping TSR (S228: No), the control 200 returns to S222. If the peak measured torque TPK is greater than or equal to the torque at the start of ramping TSR (S228: Yes), the control 200 proceeds to S232.

Because of the configuration of most electric torque-applying tools, the controller 102 issues a series of speed commands SC. In a typical embodiment of the present invention, a speed command SC is issued to the tool 102 every millisecond. Before any speed ramp RAMPS begins, the controller 102 sets a time counter equal to zero. In S232, it is determined if the time counter is set to zero. If the time counter is set to zero (S232: Yes), the control 200 proceeds to S234 where the speed at the start of the ramp SSR is set to the current speed SPEED as determined by the sensor package 110. Control 200 then proceeds to S236. In S236, the slope of the speed ramp RAMPS is calculated, as in equation (4):

$$RAMPS = (SSR - SER)/(TER - TSR) \quad (4)$$

Equation (4) defines a linear speed ramp RAMPS based on the speed at the start of the ramp SSR, the speed at the end of the ramp SER, the torque at the end of the ramp TER and the torque at the start of the ramp TSR.

After calculating the speed ramp RAMPS in S236, the control 200 proceeds to S238 and the time counter is incremented by a defined time period Δt, 1 ms in this embodiment, and control 200 proceeds to S240. In S240, a speed command SC is calculated, as in equation (5):

$$SC=SSR-\text{RAMPS}(TPK-TSR) \quad (5)$$

After calculation of the speed command in S240, control 200 proceeds to S242 where the speed command SC is issued to the motor 104 to set the speed of the motor 104 to the value of the speed command SC. Control 200 then returns to S222.

As discussed above, the percent of programmed torque at the end of ramping TER % and the percent of rated speed at the end of ramping SER % are fixed values in the control 200. However, as the percent of programmed torque at the end of ramping TER % and the percent of rated speed at the end of ramping SER % are fixed values, the control 200 has a potential for torque overshoot, especially on hard joints. Empirical testing has shown that the actual speed of the motor 104 at each 1 ms time interval is consistently higher than the speed command SC. This disparity occurs especially at high speeds, because the response time of a servo control loop implemented as the control 200 will allow the actual too speed to lag the speed command SC. Increasing the gains in the servo control loop can reduce this lag time, but high gains may cause the system to become unstable, resulting in undesired and damaging mechanical vibrations in the tool 100.

However, if the percent of programmed torque at the end of ramping TER % is made variable, the torque at the end of ramping TER can be set to lower than 100% of the programmed torque TP, which provides leeway to correct for torque overshoot. The percent of the programmed torque at the end of ramping TER % is determined by examining the performance of a particular model of the tool 100.

In a second embodiment of the present invention, the percent of programmed torque at the end of ramping TER % and the percent of rated speed at the end of ramping SER % are variable. To promote ease of use and to prevent the user from selecting potentially incorrect or damaging values of the percent of programmed torque at the end of ramping TER % and the percent of rated speed at the end of ramping SER %, the controller 102 contains a number of discrete sets of the percent of programmed torque at the end of ramping TER % and the percent of rated speed at the end of ramping SER % values, and the user chooses from among these discrete sets of values. For example, one set of values (also referred to as a "tightening level") may specify that the percent of programmed torque at the end of ramping TER % is 60% of the programmed torque TP and the percent of rated speed at the end of ramping SER % is 20% of the tool's rated speed.

Figure 3A:
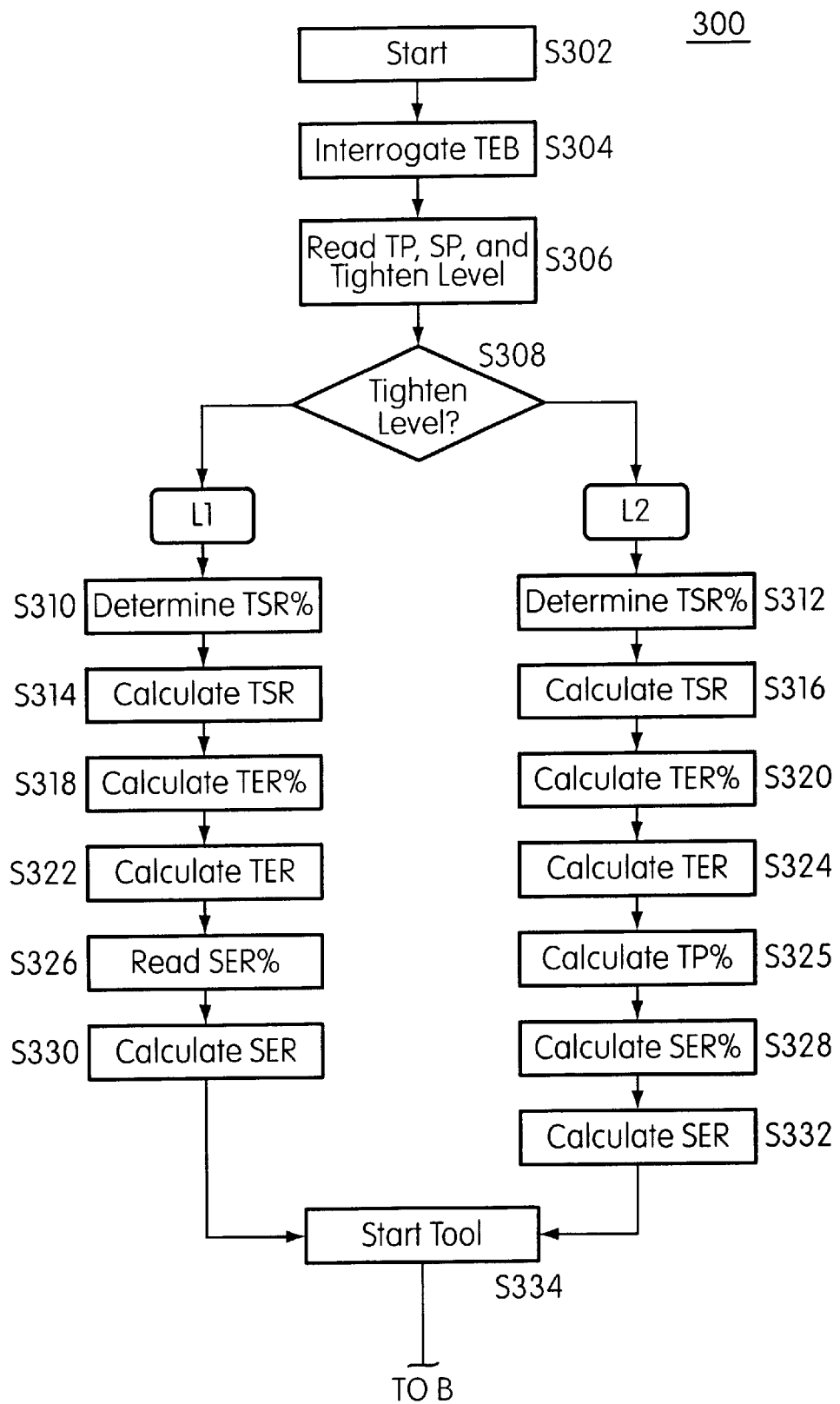
FIGS. 3A and 3B are flow diagrams illustrating another method of controlling a tool according to another exemplary embodiment of the present invention.
Figure 3B:
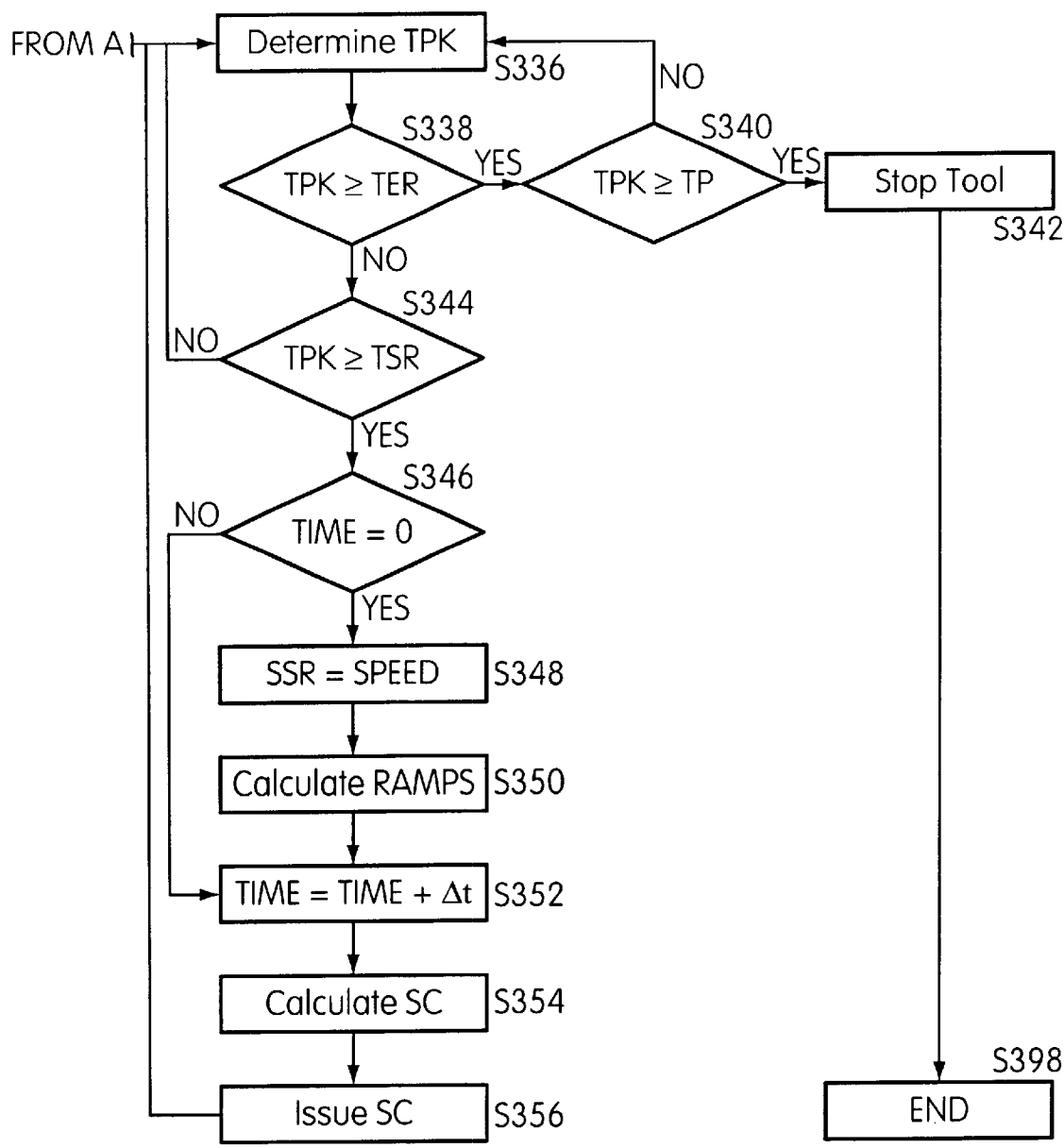

FIGS. 3A and 3B are flow diagrams illustrating a control 300 in accordance with the second embodiment of the present invention. Control 300 begins at S302, and control passes to S304, in which the tool electronics board 108 is interrogated to determine the capabilities of the tool 100. Control then proceeds to S306. In S306, the controller 102 reads the user-defined programmed torque TP and programmed speed SP values. Control passes to S308.

In control 300, the values of the percent of programmed torque at the end of ramping TER % and the percent of rated speed at the end of ramping SER % are not fixed values. During the programming of the controller 102, the user is permitted to choose between one of two predetermined "tightening levels", each level defining specific settings for the percent of programmed torque at the end of ramping TER % and the percent of rated speed at the end of ramping SER %. In this embodiment, the "level 1" settings are intended for applications where precise torque control is a high priority. In level 1, the percent of rated speed at the end of ramping SER % is set to a value of 20% of the tool's rated speed and the percent of programmed torque at the end of ramping TER % is determined based upon the programmed speed SP. In level 2, the percent of rated speed at the end of ramping SER % value is calculated based on the percent of the tool's rated torque. Level 2 settings are designed to reduce the time-to-torque and are useful for applications where precise torque control is not the highest priority.

If it is determined in S308 that the user has selected level 1 tightening settings (S308:L1), control passes to S310. In S310, the controller 102 determines the percent of programmed torque at the start of ramping TSR % in a manner identical to that of control 200. Control 300 then passes to S314. In S314, the controller 102 calculates the torque at the start of ramping TSR as in control 200. Control passes to S318.

In S318, the controller 102 calculates the value for the percent of programmed torque at the end of ramping TER %. In control 300, the percent of programmed torque at the end of ramping TER % is calculated based on the programmed speed SP of the tool 100. In an exemplary embodiment, if the tool's programmed speed is greater than a first speed, for example 2001 RPM, the percent of programmed torque at the end of ramping TER % is set to 20%. If, in this exemplary embodiment, the tool's programmed speed is less than a second speed, for example 501 RPM, the percent of programmed torque at the end of ramping TER % is set to 100%. Otherwise, the percent of programmed torque at the end of ramping TER % is calculated according equation (6):

$$TER\ \%=C1\cdot SP+C2 \quad (6)$$

In equation (6), C1 is an empirically determined coefficient that is dependent on the various parameters of the tool, including, for example, the speed and torque rating of the motor and C2 is an offset value. In an exemplary embodiment of the invention, C1 is −0.04 and C2 is 100. Control 300 then passes to S322, in which torque at the end of ramping TER is calculated as in control 200. Control passes to S326.

In S326, the controller 102 reads the value of the percent of rated speed at the end of ramping SER %, which, for level 1 tightening, is set to a fixed value of 20%. Control 300 then passes to S330, in which the controller 102 calculates the speed at the end of ramping SER as in method 200. Control 3300 then passes to S334, in which the tool 100 is started.

If the controller 102 determines that the user has selected tightening level 2 (S308:L2), control 300 then proceeds sequentially through S312, S316, S320, S324, S325, S328, S332 and S334. Of those blocks, only S325 and S328 differ from the functions described in the level 1 discussion above.

In S325, the controller 102 calculates the value of the percent of rated torque TP %, which is the ratio of the programmed target torque TP to the torque rating of the tool TR. Control 300 passes to S328.

In S328, the controller 102 calculates the value of the percent of rated speed at the end of ramping SER %. In level 1 tightening (S326), the percent of rated speed at the end of ramping SER % is fixed at 20%. In level 2 tightening, the percent of rated speed at the end of ramping SER % is calculated by the controller 102 based upon the target torque percent of rated torque TP %, which is the ratio of the programmed target torque TP to the torque rating TR of the tool 100. If the target torque percent of rated torque TP % is high, for example 90% or above, the tool 100 is being run close to capacity. However, if the target torque percent of rated torque TP %, is low, for example 50% or less, the tool is being run below capacity. The percent of rated speed at the end of ramping SER % is decreased as the target torque percent of rated torque TP % decreases because control of the tool at lower capacities is made more difficult due to the inertia of the tool 100.

Figure 8:
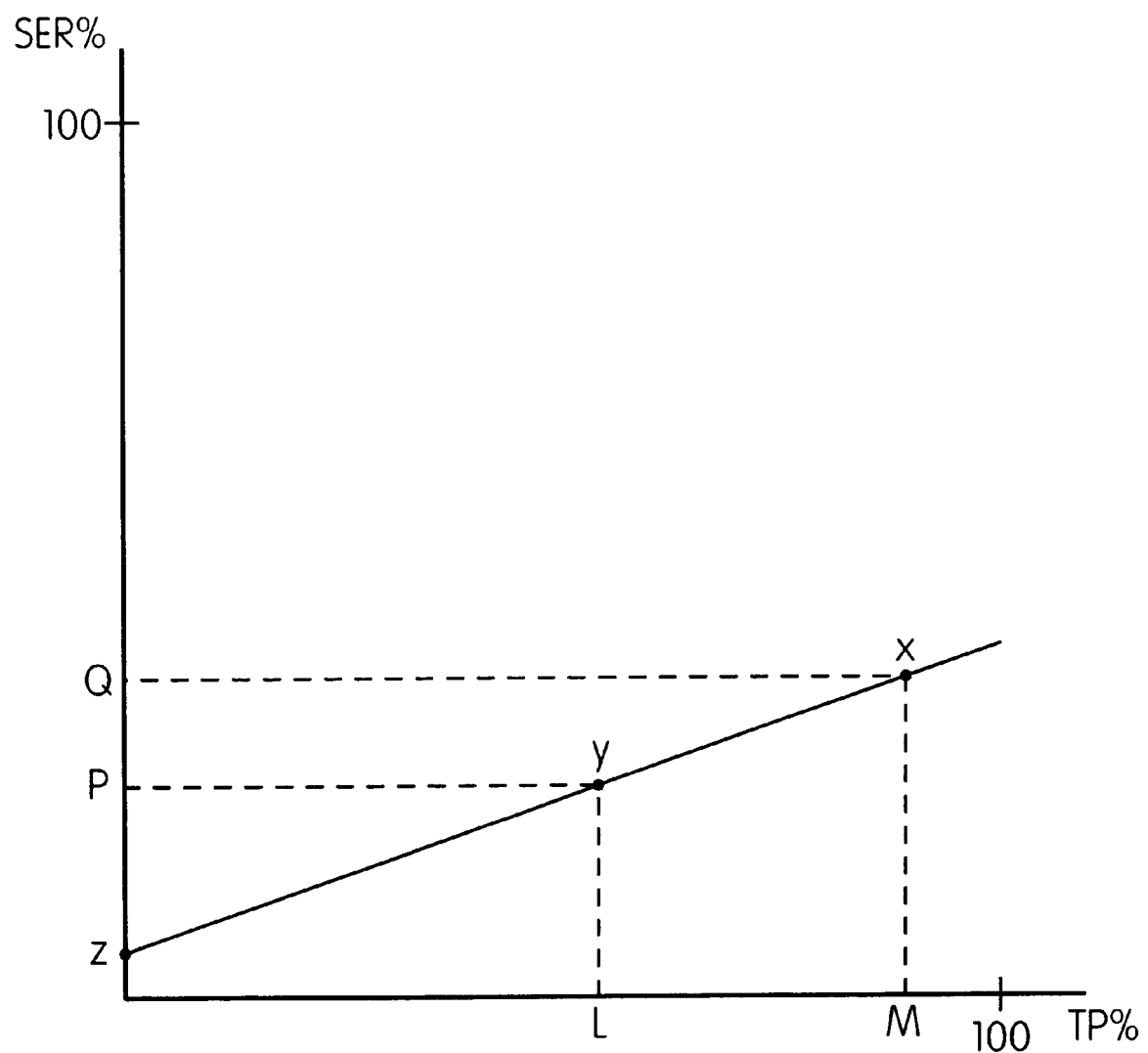
FIG. 8 is a graph explaining the relationship between the percent of rated speed at the end of ramping versus the target torque percent of rated torque.

Referring to FIG. 8, the relationship between the percent of rated speed at the end of ramping SER % to the target torque percent of rated torque TP % is shown, i.e., the relationship between the rated speed at the end of ramping SER % to the capacity at which the tool 100 is used. At point X, the tool 100 is being operated at a level closer to its full capacity than at point Y. At point X, the target torque percent of rated torque TP % has a value M, for example 90%, and the percent of rated speed at the end of ramping SER % has a value Q, for example 30%. At point Y, the target torque percent of rated torque TP % has a value L, for example 50% and the percent of rated speed at the end of ramping SER % has a value P, for example 20%. The percent of rated speed at the end of ramping SER % is set according to equation (7):

$$SER\ \% = R \cdot TP\ \% + Z \qquad (7)$$

wherein R is the rate of change of the percent of rated speed at the end of ramping SER % to the target torque percent of rated torque TP %, which is defined as (Q−P)/(M−L), and Z is an offset value. In the example discussed above, R=0.25=(30−20)/(90−50) and Z=7.5. The percent of rated speed at the end of ramping SER % of the example discussed above thus equals 0.25·TP %+7.5.

It should be appreciated that the rate of change of the percent of rated speed at the end of ramping SER % to the target torque percent of rated torque TP % is empirically determined and depends on the paramaters of the tool 100, including, for example, the speed and torque rating of the tool 100. It should also be appreciated that the relationship between the percent of rated speed at the end of ramping SER % and the target torque percent of rated torque TP % may not be linear. The relationship may be defined by a stepwise function, for example.

Once the torque at the end of ramping TER and the speed at the end of ramping SER are determined, control 300 proceeds similarly to control 200, i.e., the purpose and flow of blocks S336–S398 generally correspond with blocks S222–S298 of control 200; therefore, the discussion presented above with respect to blocks S222–S298 of control 200 will suffice to describe the corresponding functional blocks of control 300.

It should be understood that any appropriate values may be chosen for the parameters of controls 200 and 300 described above. The individual parameters that are used will vary with the type and characteristics of the tool and controller to which controls 200 and 300 are applied. In addition, some special considerations apply when controls 200 and 300 are applied to fluid powered tools. These considerations will be described in detail below.

The characteristics and advantages of the present invention will be further described with reference to the following examples. The examples illustrate exemplary results achieved using controls 200 and 300 on various types of soft, medium, hard and irregular joints. Examples 1–3 illustrate idealized versions of soft, medium, and hard joint for purposes of explanation and illustration. It is understood that in a production environment, most joints have at least some irregularity.

EXAMPLE 1

Soft Joint

Figure 4A:
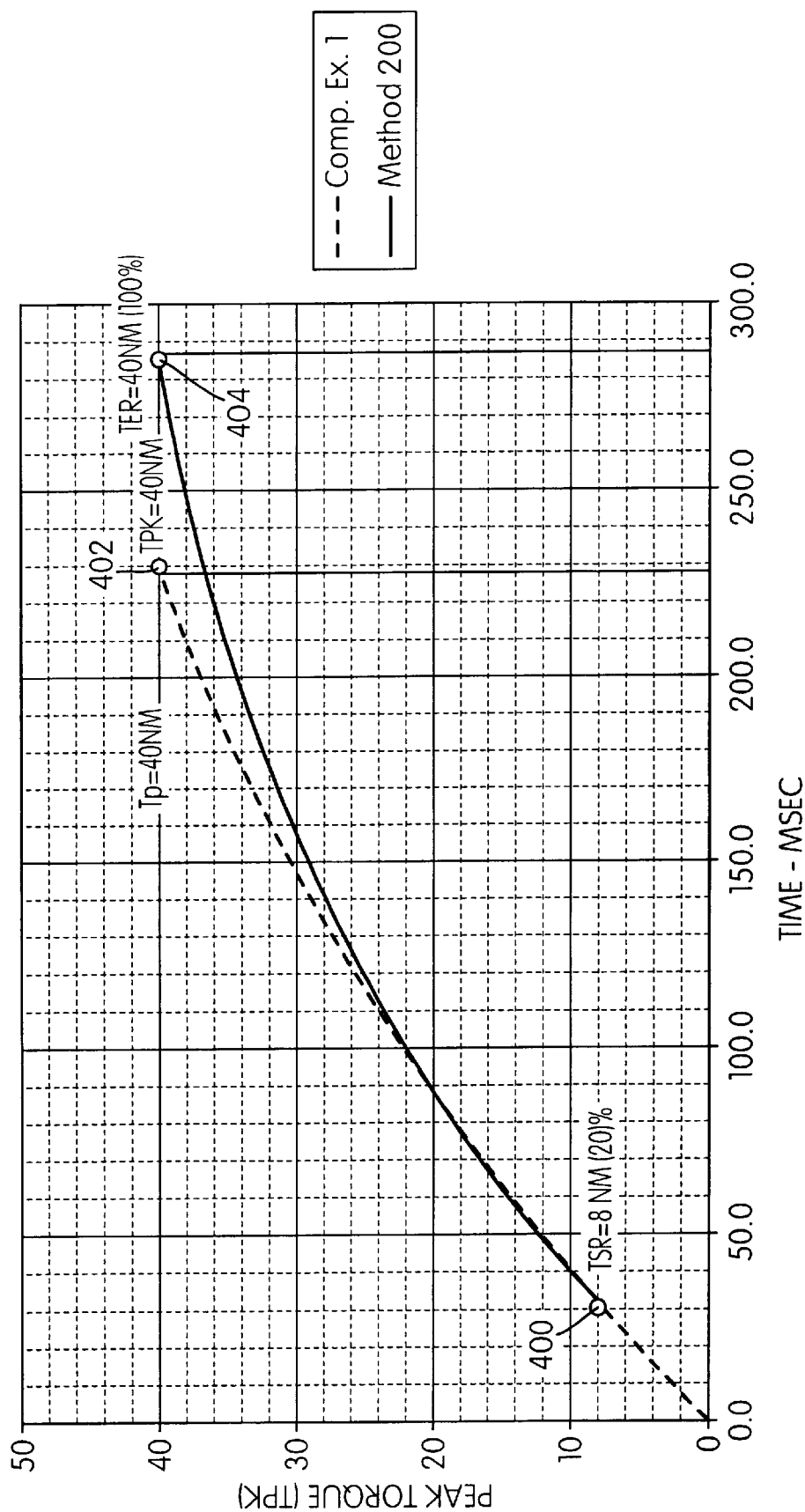
FIGS. 4A and 4B are plots illustrating a first example of a use of the present invention.
Figure 4B:
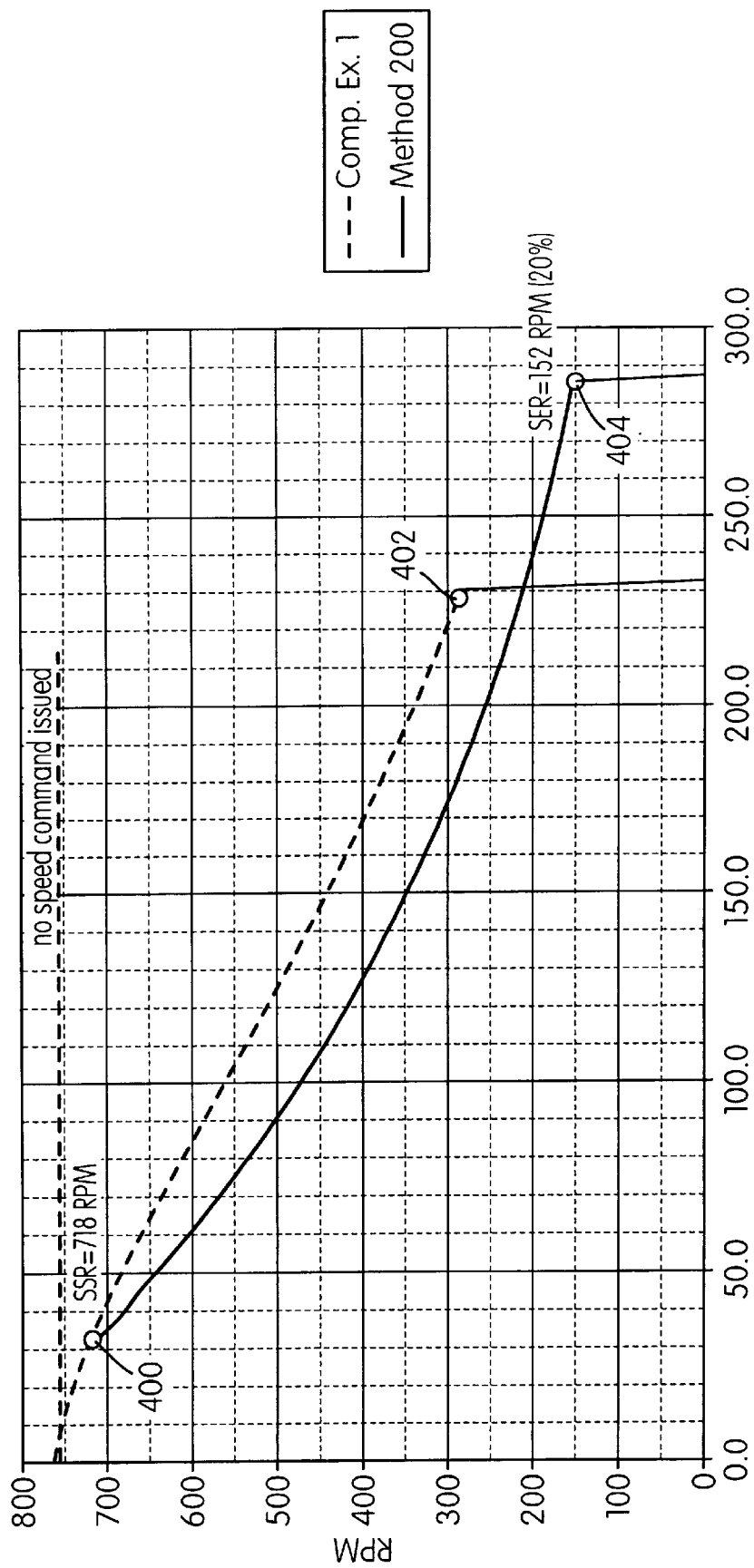

FIGS. 4A and 4B illustrate Example 1, the control 200 as applied to an idealized soft joint. FIG. 4A shows a plot of time in milliseconds versus measured peak torque for a tool 100 employing control 200 and for a comparable tool without control 200. Both tools are applied to a soft joint. In Example 1, the programmed torque is 40 Newton meters (Nm) and the programmed free speed is 760 RPM. The speed ramp for the tool using control 200 begins at point 400 and terminates at point 404. The comparable tool without control 200 stops at point 402. FIG. 4B is a plot of time versus tool speed in RPM, illustrating the speed profile of the two tools.

In FIGS. 4A and 4B, the joint is soft, therefore, the rate of torque application is very low, and consequently, there is very little torque overshoot in either the tool employing control 200 or the comparable tool. Note that for both tools the microprocessor in the controller takes approximately 2 ms after TP is reached to shut down the tool. This 2 ms time delay is not significant in Example 1 because the rate of torque application is very low. The use of control 200 does result in an approximately 20% increase in the time-to-torque, as is shown in FIGS. 4A and 4B, but this increase in time is not generally noticed by the user because the tightening process is completed in a fraction of a second.

EXAMPLE 2

Medium Joint

Figure 5A:
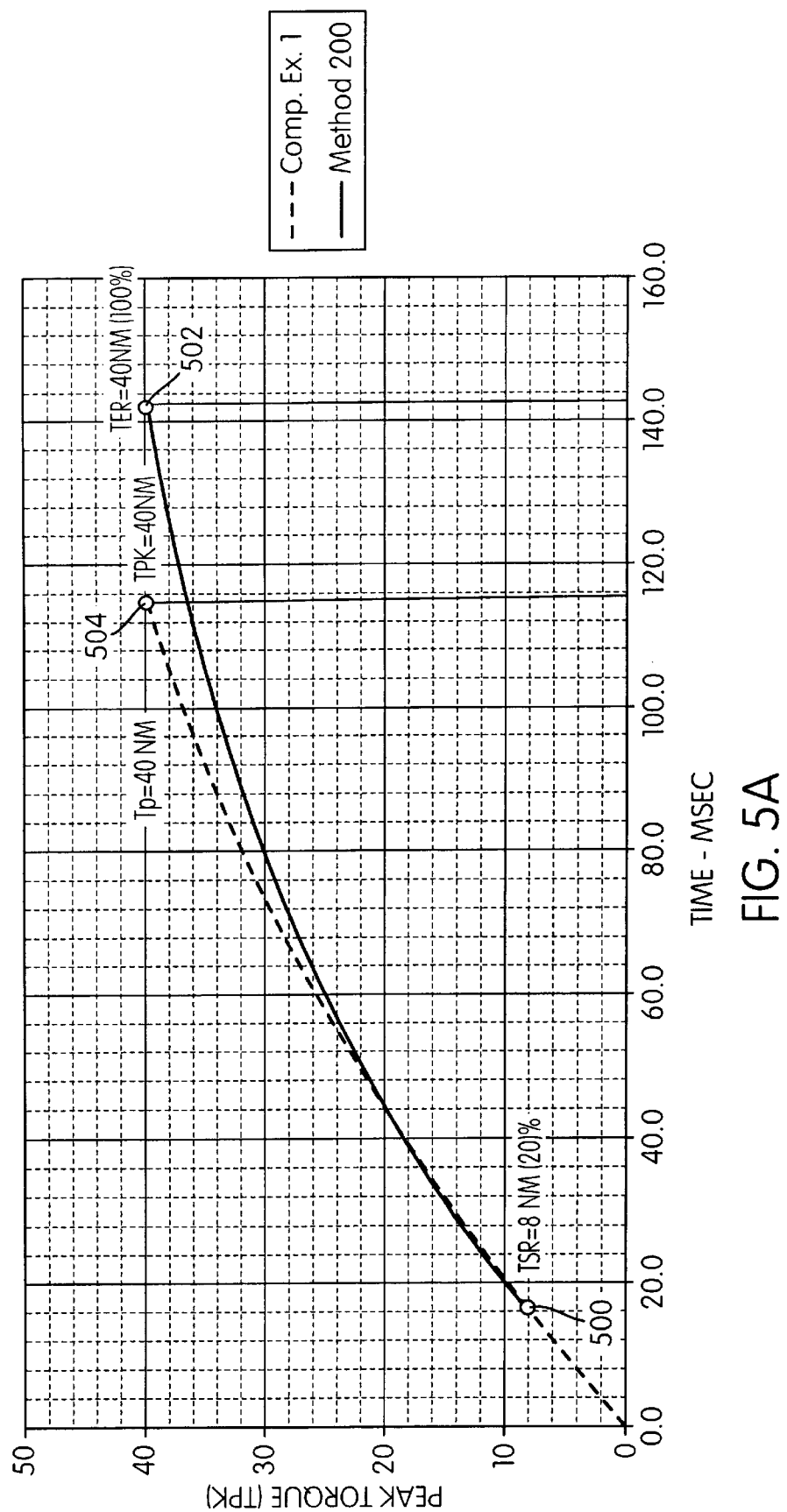
FIGS. 5A and 5B are plots illustrating a second example of a use of the present invention.
Figure 5B:
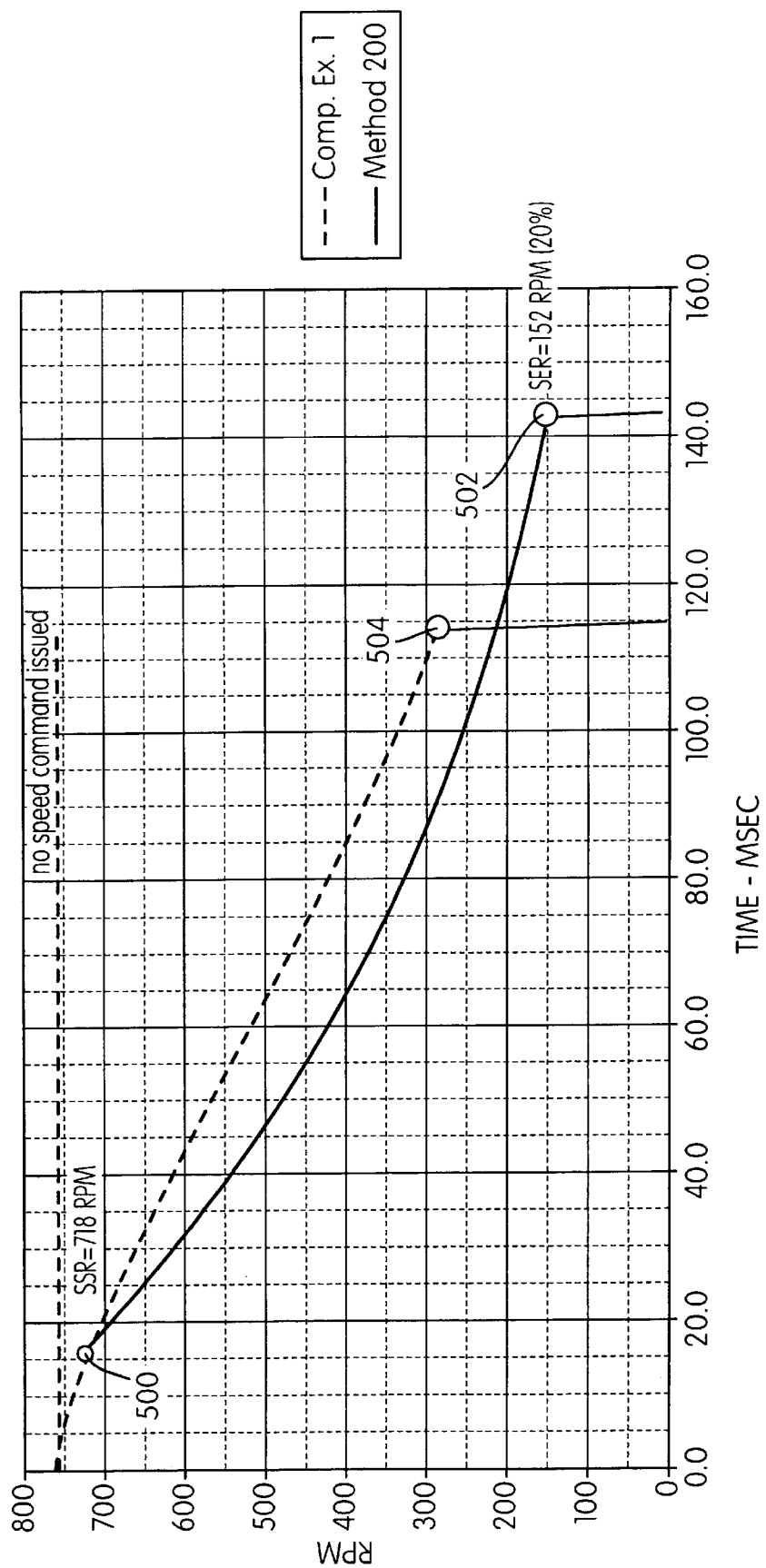

FIGS. 5A and 5B illustrate Example 2, the control 200 as applied to an idealized medium joint. FIG. 5A shows a plot of time in milliseconds versus measured peak torque for a tool 100 employing control 200 and for a comparable tool without control 200. Both tools are applied to a medium joint. In Example 2, the programmed torque is 40 Newton meters (Nm) and the programmed free speed is 760 RPM. The speed ramp for the tool using control 200 begins at point 500 and terminates at point 502. The comparable tool without control 200 stops at point 504. FIG. 5B is a plot of time versus tool speed in RPM, illustrating the speed profile of the two tools.

As in the soft joint of Example 1, the rate of torque application in the medium joint is relatively low, and thus, there is substantially no torque overshoot in either tool. As in Example 1, the 2 ms delay imposed by the response time of the controller is not significant in either tool. In Example 2, use of control 200 causes a 25% increase in time-to-torque, but as in Example 1, this increased time-to-torque will likely go unnoticed by the user.

EXAMPLE 3

Hard Joint

Figure 6A:
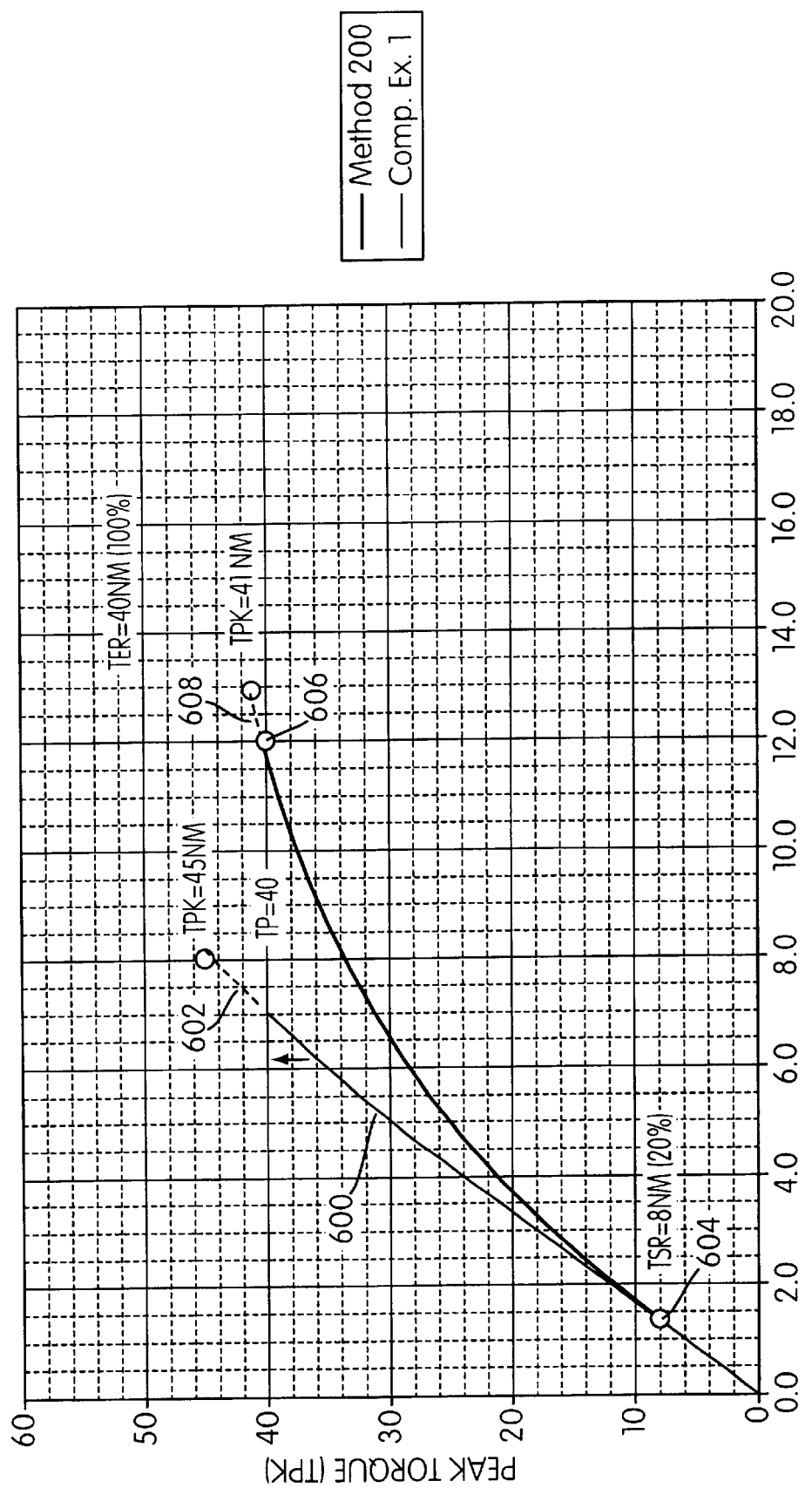
FIGS. 6A and 6B are plots illustrating a third example of a use of the present invention.
Figure 6B:
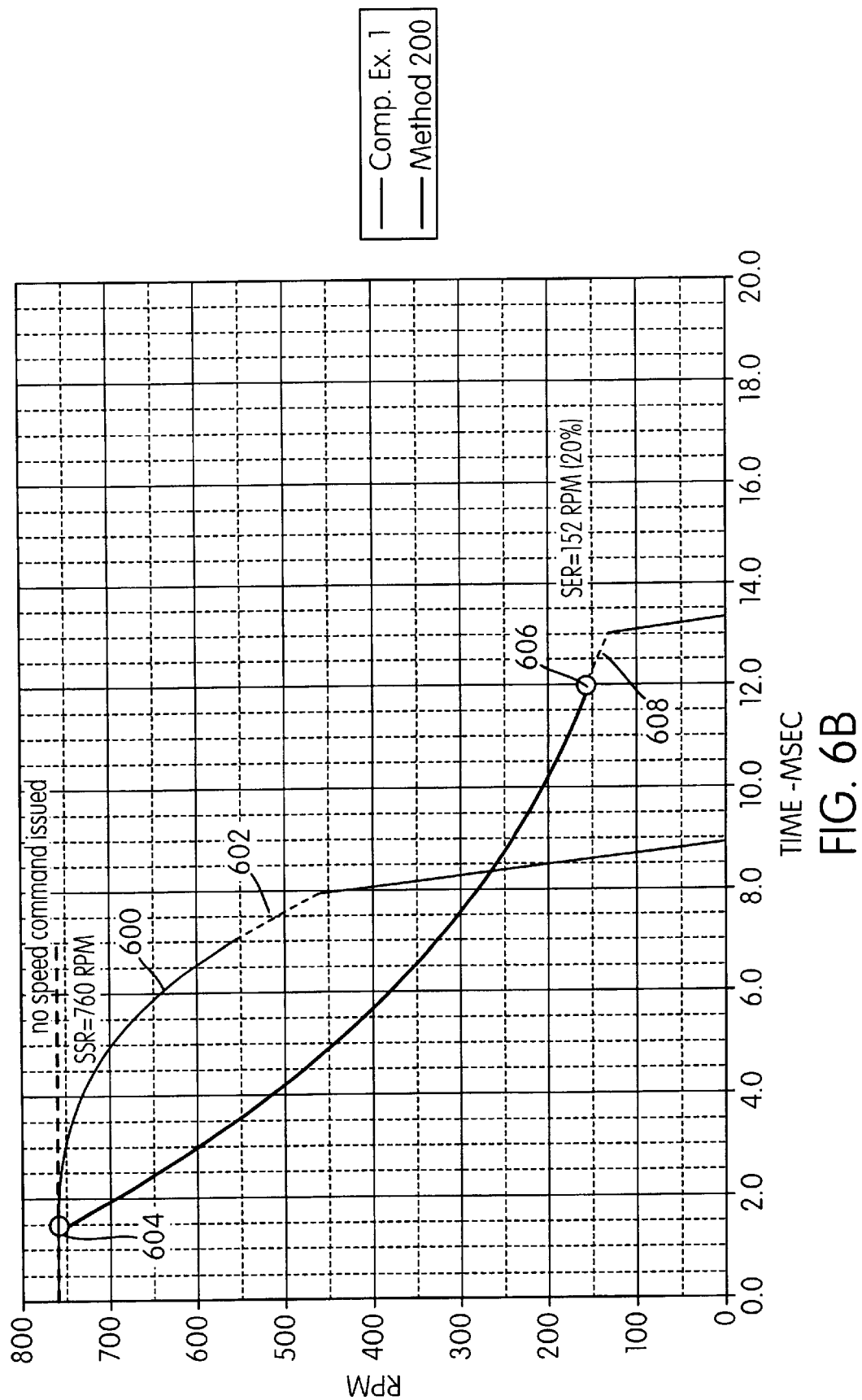

The advantages of the present invention are most clearly seen in the case when a tool employing one of the controls 200 or 300 described above is used on a hard joint. FIGS. 6A and 6B illustrate Example 3, the use of tool 100 on an idealized hard joint. As in the previous Examples, both FIGS. 6A and 6B include data for a comparable tool used on the same joint without one of controls 200 and/or 300 of the present invention.

As is evident from both FIG. 6A and FIG. 6B, the rate of torque application for a hard joint is about an order of magnitude greater than for a soft or medium joint, the fastening task is complete in just over 10 ms, rather than 100–200 ms. Because the rate of torque application is so great for a hard joint, torque overshoot is typically a problem, because the tool is usually spinning very quickly when the programmed torque is reached.

FIG. 6A clearly shows the typical torque overshoot in the comparable tool without controls 200 and 300. In this Example, the programmed torque is 40 Nm, but the comparable tool, indicated at trace 600, overshoots to 45 Nm because of the 2 ms delay caused by the response time of the microprocessor in the controller. This 2 ms delay is illustrated in FIG. 6A by dotted-line curve segment 602.

By contrast, the tool using control 200 begins a speed ramp at point 604 and reaches the programmed torque at point 606. As shown in FIG. 6B, the speed of the tool when TP is reached is only 152 RPM, about 25% of the speed of the comparable tool at TP. The 2 ms response delay of the controller for the tool using controls 200 and 300 results in a torque overshoot of only 1 Nm, as indicated by dotted-line segment 608.

In the case of a hard joint, the speed at the beginning of the speed ramp for a tool 100 is greater than the speeds at the beginning of the speed ramps in soft and medium joints. This is because the rotational kinetic energy of the tool contributes a significant portion of the energy required to tighten a fastener into a hard joint.

EXAMPLE 4

Irregular Joint

Examples 1–3 show linear joints in which the amount of torque on the joint monotonically increases. However, joints are frequently irregular in their characteristics. FIG. 7A shows a typical time versus torque plot for a tool 100 using one of controls 200 and 300 applied to an irregular joint. In FIG. 7A, two sets of data are plotted, the measured torque values at each instant in time, and the peak torque values at each instant in time.

As was explained briefly above, controls 200 and 300 of the present invention use the measured peak torque (TPK) values to control speed ramping, rather than the measured torque values. This distinction is especially important in the case of irregular joints. In the irregular joint illustrated in FIG. 7A, the torque on the irregular joint increases linearly until point 704 (the controller begins a speed ramp at point 702). After point 704, the torque on the joint increases nonlinearly until point 706. Between point 706 and point 707 on the curve, the torque/turn rate of the joint decreases as the joint members yield and re-align. Between point 707 and point 708, the joint experiences a momentary, sharp drop in torque/turn rate, during which the measured torque and peak torque values do not agree.

If controls 200 and 300 of the present invention used the measured torque values to control the speed ramp, the momentary drop in torque/turn rate at point 708 would cause the tool to speed up, an effect which would be undesirable. (As was explained earlier, quick changes in tool speed can cause the system to become unstable.) The use of the peak torque values eliminates this problem, as is made clear in FIG. 7A. The irregular joint goes through several additional periods of variation in torque/turn rate before the speed ramp terminates at point 710. FIG. 7B shows the corresponding time versus RPM plot. In FIG. 7B, the effect of the 2 ms controller response delay is visible as dotted-line segment 712.

Use on Fluid Powered Tools

As was explained above, controls 200 and 300 of the present invention may be applied to fluid-powered tools, such as pneumatic and hydraulic torque-applying tools. However, fluid-powered tools differ somewhat from electric-powered tools, and may require some slight adaptations to controls 200 and 300.

In fluid-powered tools, one known way of measuring the tool's rotational velocity is by installing an angular encoder in the fluid-powered tool. Control 200 or 300 could then be implemented using the fluid-powered tool. Note that fluid powered tools typically have longer response times than electric-powered tools, therefore, the parameters of controls 200 and 300 would need to be modified appropriately to compensate for the longer response times. Control 300 may be particularly suited to use in fluid-powered tools because of its greater adaptability.

As a further embodiment of the present invention, if an angle encoder is installed in either a fluid- or electric-powered tool, the angle encoder could be used to determine if a bolt has cross-threaded, or if other error conditions exist. For error detection with an angular encoder, the controller 102 would be programmed to expect that a fastening job will require a certain amount of rotation (e.g., 360 or 720 degrees). If a programmed torque is reached before the expected amount of rotation is achieved, it may indicate that a fastener has cross-threaded, or that the operator has tried to tighten the same bolt twice. Conversely, if the programmed torque is not reached after a large amount of rotation, it indicates that the fastener may be stripped. To implement error detection, the controller 102 would compare the amount of rotation with the TPK value, and would indicate error conditions as appropriate.

While the invention has been described by way of example embodiments, it is understood that the words which have been used herein are words of description, rather than words of limitation. Changes may be made within the purview of the appended claims without departing from the scope and spirit of the invention in its broader aspects. Although the invention has been described herein with reference to particular controls and embodiments, it is understood that the invention is not limited to the particulars disclosed. The invention extends to all appropriate equivalent structures, uses and mechanisms.

What is claimed is:

1. A method of controlling a torque applying tool to apply a selected torque by controlling a speed of the torque applying tool, the method comprising:

calculating a first torque at an end of a deceleration ramp that is a percentage of the selected torque;

calculating a second torque at a start of the deceleration ramp that is a percentage of the selected torque;

calculating a first speed at the end of the deceleration ramp that is a percentage of a selected speed;

periodically determining a peak torque applied by the tool;

determining if the peak torque is greater than or equal to the first torque;

stopping the tool, if the peak torque is greater than or equal to the first torque and the selected torque;

determining if the peak torque is greater than or equal to the second torque, if the peak torque is not greater than the first torque; and calculating parameters descriptive of the deceleration ramp and controlling the speed in accordance with the parameters, if the peak torque is greater than or equal to the second torque.

2. The method of claim 1, wherein the first torque is a first fixed percentage of the selected torque, the second torque is a second fixed percentage of the selected torque and the first speed is a fixed percentage of the selected speed.

3. The method of claim 2, wherein the first torque is one hundred percent of the selected torque, the second torque is twenty percent of the selected torque and the first speed is twenty percent of the selected speed.

4. The method of claim 1, wherein the first torque is a variable percentage of the selected torque.

5. The method of claim 4, wherein the variable percentage is defined as $$TER\% = C1 \cdot SP + C2,$$

wherein TER % is the variable percentage, C1 is a coefficient, SP is a programmed speed of the torque applying tool between a first programmed speed and a second programmed speed higher than the first programmed speed, and C2 is an offset value.

6. The method of claim 5, wherein the coefficient C1 is −0.04, the offset value C2 is 100, the first programmed speed is 501 rpm, the second programmed speed is 2001 rpm and the variable percentage TER % is 20% if the programmed speed SP is greater than 2001 rpm, and the variable percentage TER % is 100% if the programmed speed is less than 501 revolutions per minute.

7. The method of claim 1, wherein the first speed is a variable percentage of the selected speed.

8. The method of claim 7, wherein the variable percentage is defined as $$SER\% = R \cdot TP\% + Z,$$

wherein SER % is the variable percentage, TP % is a ratio of the selected torque to a torque rating of the torque applying tool, R is the rate of change of the variable percentage SER % to the ratio of the selected torque to the torque rating TP %, and Z is an offset value.

9. The method of claim 8, wherein the R is 0.25 and Z is 7.5.

10. The method of claim 1, wherein calculating the parameters descriptive of the deceleration ramp includes calculating a slope of the deceleration ramp as $$RAMPS = (SSR - SER)/(TER - TSR),$$

wherein RAMPS is the slope of the deceleration ramp, SSR is a second speed at the start of the deceleration ramp, TER is the first torque and TSR is the second torque.

11. The method of claim 10, wherein the second speed is a current speed of the torque applying tool at the start of the deceleration ramp.

12. The method of claim 1, wherein controlling the speed in accordance with the parameters includes issuing a speed command to the torque applying tool, the speed command defined as $$SC = SSR - RAMPS(TPK - TSR),$$

wherein SC is the speed command, SSR is a second speed at the start of the deceleration ramp, RAMPS is a slope of the deceleration ramp, TPK is the peak torque, and TSR is the second torque.

13. The method of claim 1 wherein the peak torque is determined every millisecond.

14. A method of controlling a torque applying tool to apply a selected torque by controlling a speed of the torque applying tool, the method comprising:

determining a final torque value;

determining a final speed value;

decreasing speed levels until the torque applying tool reaches the final torque value and the final speed value;

periodically measuring the torque level until the final torque value is measured; and stopping the torque applying tool when the selected torque value is reached.

15. A torque applying tool that:

calculates a first torque at an end of a deceleration ramp that is a percentage of a selected torque;

calculates a second torque at a start of the deceleration ramp that is a percentage of the selected torque;

calculates a first speed at the end of the deceleration ramp that is a percentage of a selected speed;

periodically determines a peak torque applied by the tool;

determines if the peak torque is greater than the first torque;

stops the tool, if the peak torque is greater than or equal to the first torque and the selected torque;

determines if the peak torque is greater than or equal to the second torque, if the peak torque is not greater than the first torque; and calculates parameters descriptive of the deceleration ramp and controls the speed in accordance with the parameters, if the peak torque is greater than or equal to the second torque.

16. The torque applying tool of claim 15, wherein the first torque is a first fixed percentage of the selected torque, the second torque is a second fixed percentage of the selected torque and the first speed is a fixed percentage of the selected speed.

17. The torque applying tool of claim 16, wherein the first torque is one hundred percent of the selected torque, the second torque is twenty percent of the selected torque and the first speed is twenty percent of the selected speed.

18. The torque applying tool of claim 15, wherein the first torque is a variable percentage of the selected torque.

19. The torque applying tool of claim 18, wherein the variable percentage is defined as $$TER\% = C1 \cdot SP + C2,$$

wherein TER % is the variable percentage, C1 is a coefficient, C2 is an offset value, and SP is a programmed speed of the torque applying tool between a first programmed speed and a second programmed speed higher than the first programmed speed.

20. The torque applying tool of claim 19, wherein the coefficient C1 is −0.04, the offset value C2 is 100, the first programmed speed is 501 rpm, the second programmed speed is 2001 rpm and the variable percentage TER % is 20% if the programmed speed SP is greater than 2001 rpm, and the variable percentage TER % is 100% if the programmed speed is less than 501 revolutions per minute.

21. The torque applying tool of claim 15, wherein the first speed is a variable percentage of the selected speed.

22. The torque applying tool of claim 21, wherein the variable percentage is defined as $$SER\% \; R \cdot TP\% + Z,$$

wherein SER % is the variable percentage, TP % is a ratio of the selected torque to a torque rating of the torque applying tool, R is the rate of change of the variable percentage SER % to the ratio of the selected torque to the torque rating TP %, and Z is an offset value.

23. The torque applying tool of claim 22, wherein the R is 0.25 and Z is 7.5.

24. The torque applying tool of claim 15, wherein calculation of the parameters descriptive of the deceleration ramp includes calculation of a slope of the deceleration ramp as $$RAMPS=(SSR-SER)/(TER-TSR),$$

wherein RAMPS is the slope of the deceleration ramp, SSR is a second speed at the start of the deceleration ramp, TER is the first torque and TSR is the second torque.

25. The torque applying tool of claim 24, wherein the second speed is a current speed of the torque applying tool at the start of the deceleration ramp.

26. The torque applying tool of claim 15, wherein control of the speed in accordance with the parameters includes issuance of a speed command to the torque applying tool, the speed command defined as $$SC=SSR-RAMPS(TPK-TSR),$$

wherein SC is the speed command, SSR is a second speed at the start of the deceleration ramp, RAMPS is a slope of the deceleration ramp, TPK is the peak torque, and TSR is the second torque.

27. The torque-applying tool of claim 15, wherein the peak torque is determined every millisecond.

28. The torque applying tool of claim 15, wherein the torque applying tool is an electric torque applying tool.

29. The torque applying tool of claim 15, wherein the torque applying tool is a hydraulic torque applying tool.

30. The torque applying tool of claim 15, wherein the torque applying tool is a pneumatic torque applying tool.

31. A controller for a torque applying tool that:
- calculates a first torque at an end of a deceleration ramp that is a percentage of a selected torque;
- calculates a second torque at a start of the deceleration ramp that is a percentage of the selected torque;
- calculates a first speed at the end of the deceleration ramp that is a percentage of a selected speed;
- periodically determines a peak torque applied by the tool;
- determines if the peak torque is greater than the first torque;
- stops the tool, if the peak torque is greater than or equal to the first torque and the selected torque;
- determines if the peak torque is greater than or equal to the second torque, if the peak torque is not greater than the first torque; and
- calculates parameters descriptive of the deceleration ramp and controls the speed in accordance with the parameters, if the peak torque is greater than or equal to the second torque.

* * * * *